April 22, 1958     P. TENENBAUM     2,831,704
TRAILER KING PIN CONSTRUCTION
Filed Nov. 14, 1957
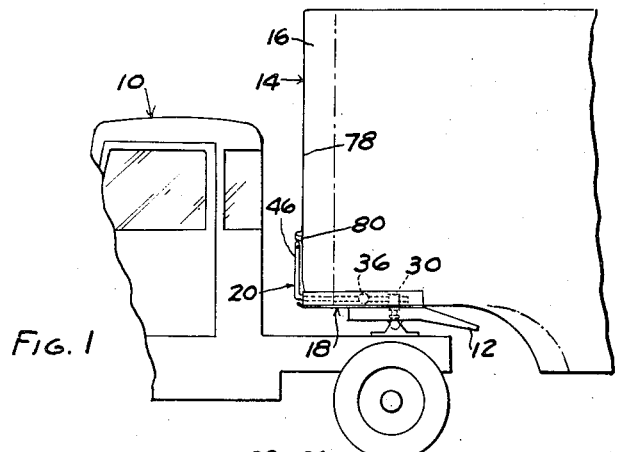
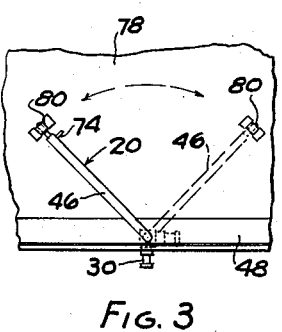
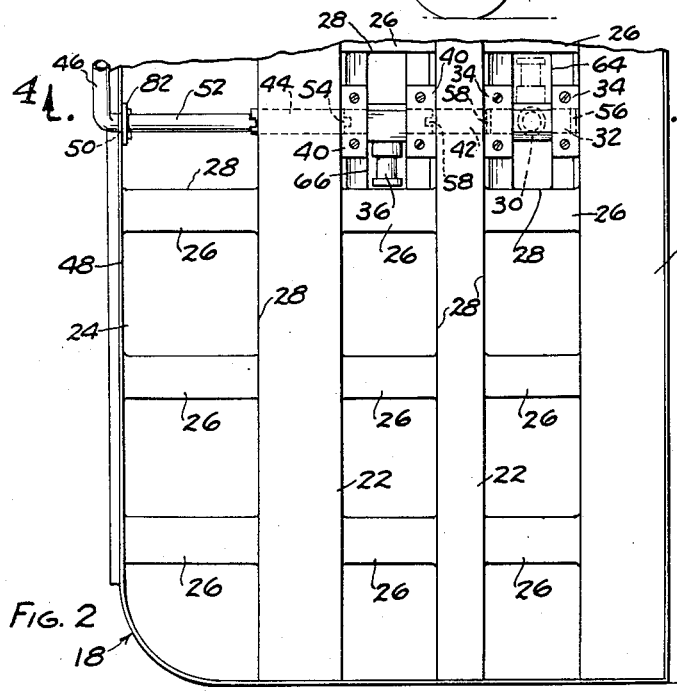
INVENTOR.
PAUL TENENBAUM
BY
ATTORNEY

United States Patent Office 2,831,704
Patented Apr. 22, 1958

2,831,704

TRAILER KING PIN CONSTRUCTION

Paul Tenenbaum, Oak Park, Mich., assignor to Copco Steel & Engineering Company, Copco Trailer Division, Detroit, Mich., a corporation of Michigan Application November 14, 1957, Serial No. 696,558

12 Claims. (Cl. 280—407)

This invention relates to a king pin construction for vehicle trailers and more particularly to a double king pin arrangement in which two king pins, spaced apart from each other longitudinally of the trailer, are conjoined so as to be each independently usable in combination with a tractor fifth wheel.

In the highway trailer industry there have developed a number of tractor trailer combinations which do not lend themselves to interchangeability or integration. In spite of efforts to achieve standardization, particular and special requirements for construction, logically and reasonably based upon the needs and exigencies of industry, roadways, governmental regulations and statutes, personnel and many other factors, continually bring forth variations in equipment. For highway hauling by tractor-trailer combinations, most transportation companies purchase trailers which have their king pins positioned about 36" from the front leading edge of the trailer body. The tractors used with these trailers have longer wheel bases and the fifth wheel is positioned further back from the driver's cab. On the highways of our country, the curves and bends in the roads have much greater radii for turning than is present in cities and villages where streets are narrow and intersections are very much smaller by comparison. For freight hauling in these areas, the tractors used are often of smaller wheel base and the fifth wheel is positioned closer to the cab to permit sharper turning of the tractor-trailer combination. A trailer for use with such tractors must therefore have its king pin closer to the leading edge of the trailer.

In the past, double king pin arrangements have provided king pins which were independent of each other, each pin being set up separately as required. Or, a single king pin was moved by hand from a rearward to a forward position on the trailer as the need arose. These constructions have not proven very satisfactory because, at times, the king pin has been improperly affixed, and has subjected the tractor coupling operation to hazards and excessive stress.

The instant invention provides a pair of king pins in conjoined arrangement, operable by a lever arrangement at the forward end of the trailer at operator height, for placing one or the other of the two king pins into fifth wheel engaging position at different distances from the leading edge of the trailer. Another object of the invention provides a pair or a series of king pins mounted on rotatable shafts in alignment longitudinally of the trailer. A further object is the provision of the axes of the king pins at right angles to each other, so that when one of the pins is disposed downwardly in fifth wheel engaging position, the second of the king pins is in parallel alignment with the floor or bottom plane of the trailer. Still another object is to provide a coupling of the king pins by their rotatable shafts, such that disposition of either pin into fifth wheel engaging position is easily and simply effected by rotative movement of a lever at a position readily accessible to an operator.

These and additional objects of the invention and features of construction will become more readily apparent and understood from the description given below, in which the terms are used for purposes of description and not of limitation.

Referring now to the several views of the drawing annexed hereto and forming an integral part of this specification, in which:

Fig. 1 is a fragmentary side elevational view of a tractor and trailer combination at the fifth wheel-king pin zone.

Fig. 2 is a fragmentary enlarged plan view of the base plane of the trailer at the front end thereof showing the coupling arrangement of the king pins and the operating lever.

Fig. 3 is a fragmentary slightly enlarged front elevational view of the trailer showing the operating lever for positioning the king pins.

Fig. 4 is a vertical sectional view, on the scale of Fig. 2, substantially on the line 4—4 of Fig. 2.

Fig. 5 is a perspective view of the king pin and shaft assembly.

Fig. 6 is a perspective view of the pin shaft support, in the nature of a pillow block.

Fig. 7 is a fragmentary vertical sectional view of the control lever in engaged position at the forward end of the trailer.

As shown in the several views of the drawing and more particularly in Fig. 1, a trailer hauling tractor 10 provided with a fifth wheel structure 12 is engageable with a trailer 14 comprising a body 16 having a base assembly 18 in which the king pin structure 20 is rotatably mounted.

The base assembly 18 disclosed in this application is a preferred form for the area in which the king pin structure 20 is disposed. It is to be clearly understood that various trailer base assemblies may be arranged, designed and constructed, so as to embody the inventive king pin structure. The particular base 18 here shown comprises a series of spaced transverse inverted channels 22 secured and welded to a base plate 24. Spaced transversely of the trailer body and extending longitudinally of the trailer are a number of inverted channel members 26 secured and welded to the base plate 24 and to the transverse channels 22, forming an extremely strong and rigid box-like base structure. Between the channel members 22 and 26 a number of wells 28 are formed, and in certain of these wells the king pin structure 20 is located as will be more specifically described below.

Longitudinally of the trailer and arranged upon the base plate 24, in wells 28, along the median line of the trailer body, the king pin structure 20 comprises a king pin 30 fixedly mounted on a shaft 32 rotatable between pillow blocks 34, a second king pin 36 on its shaft 38 rotatable between pillow blocks 40 and coupled to the first king pin 30 by a coupling shaft 42, and a second coupling shaft 44 conjoined to operating lever 46. Each of the king pins are fixedly held on their respective shafts by a tight press fit and a pin 47. The king pins and their shafts may be integrally formed as single units. The preferred construction is to make these king pin and shaft units from castings.

The front leading edge of the trailer body adjacent the base plate 24 is defined by a plate member 48 conjoined by welding to the forward channel members 26 and the base plate 24. An opening 50 is provided in the edge plate member 48 for passing the lever arm 52 which is removably conjoined to the coupling shaft 44 so that it can rotate the shaft as the lever 46 is pivoted from one position to another, as seen in Fig. 3. The shaft 44 is rotatably positioned transversely of a channel member 22, as shown and is provided at its rearward end with a key 54.

The king pin shafts 32 and 38, rotatably mounted in pillow blocks 34 and 40, respectively, are provided at each end with key slots 56 engageable with the coupling shaft key 54. The coupling shaft 42 is also provided with keys 58 at each end thereof, identical to the key 54, to engage the king pin shaft key slots 56. It will be noted that the planes of keys 58 at the ends of shaft 42 are at right angles to each other.

The king pin shafts 32 and 38 are of a length substantially the distance across the wells 28, so that the pillow blocks and each king pin shaft comprise a subassembly which utilizes the entire area of the well. The pillow blocks each comprise a base member 60 and a cap 62, suitably conjoined by screws to the base member, for rotatably supporting the king pin shafts 32 and 38. Each of the pillow blocks has its base member 60 securely affixed to the base plate 24. The exposed area between the pillow blocks in a well 28 is cut out to provide a passage for the king pin which is rotatable into fifth wheel engaging position, and rotatable out of such position by actuation of lever 46. In the well provided for king pin 30, the opening in the base plate is indicated by reference numeral 64, and for king pin 36, by numeral 66.

As shown, the axis of king pin 30 is disposed at right angles to the axis of king pin 36, so that when the lever 46 is moved from one position, as in Fig. 3, to a position 90° clockwise, the king pin 30 is rotated from its fifth wheel engaging position below base plate 24 to a position above the base plate in well 28, and king pin 36 is rotated from its position of rest parallel to the base plate into a fifth wheel engaging position below the base plate closer to the leading edge plate member 48.

To secure lever 46 in position, a retractable pin 68 loaded by spring 70, as shown in Fig. 7, has its forward end projecting from the tubular lever 46. Spring 70 bears at its lower end against the pin 72, and pin 68 is held from displacement out of the lever by the retaining pin 74 riding in lever slot 76. Mounted upon the trailer body front panel wall 78 are a pair of sleeves 80, spaced 90° apart from each other on a radius substantially equal to the length of that portion of lever 46 parallel to the front wall 78. The pin 68 is engageable in each of the sleeves 80 to be there secured against rotative movement, thus locking each of the king pins 30 or 36, into fifth wheel engaging position.

Interiorly of the front wall and fixedly mounted therein is a bearing or collar 82, in which lever arm 52 is rotatable. A retaining pin 84 through the arm 52 and bearing upon the collar 82 holds the lever arm from displacement and disengagement from the coupling shaft 44 with which it is engaged by a key 86 removably seated in a key slot at the forward end of the shaft.

Thus, each of the component elements of the king pin structure 20 is separately removable or disassembled for repair or replacement as the occasion arises, without major disassembly of the base structure, as is frequently the case today in the repair or replacement of king pin structures.

Thus, in operation, lever 46 coupled to the shaft 44 rotates king pins 36 and 30 simultaneously into and out of fifth wheel engaging position below base plate 24. Because the king pins are 90° apart, a swing of lever 46 through an arc of 90° rotates one or the other of the king pins into operating position.

As shown, the key slots 56 in the shafts 32 and 38 are horizontal for the king pin in vertical position. Thus, placing the keys 58 of the coupling shaft 42 at right angles to each other, when engaged in the king pin shaft key slots 56, causes the king pins 30 and 36 to lie at right angles to each other. The key slots 56 of one of the king pin shafts could also be arranged vertically, leaving those of the other shaft horizontal. In such event, the coupling shaft keys could be in alignment and the king pins would again be at right angles to each other when the structure 20 is assembled for operation.

One advantage of the pillow block method and structure lies in facile replacement and repair which may be required for either king pin assembly. The screws holding cap 62 are removed, the cap lifted and the king pin and shaft withdrawn from the base member 60. Because the king pin shaft lies within the limits of the well 28, the entire king pin unit is readily removable and insertable. Thus, costly disassembly and reassembly of the base structure is avoided.

It will be noted that the entire king pin structure 20 is closely aligned and integrated. The lever 46 and its arm 52 is removably conjoined by its key 86 to the coupling shaft 44, which is removably keyed to the king pin shaft 38, in turn removably engaged with coupling shaft 42, in turn removably keyed to king pin shaft 32.

In the event that more than two king pins are required, it will be understood by persons skilled in the art to which the invention pertains that additional king pins on shafts having key slots at their ends can be removably conjoined by keyed coupling shafts.

In addition, it will be understood that the rotative distance between the king pin axes, for the instant two pin arrangement as well as for combinations of more than two pins, should be no less than 90° apart in order to prevent interference with fifth wheel coupling.

The inventive structure heredisclosed has been thoroughly tested on tractor trailer combinations and has been found very satisfactory and highly successful, increasing the scope and advantages of the trailers for both highway and urban use.

Having described the invention in its simplest terms, it is to be understood that changes and variations in greater or lesser degree may be made in the features of construction heredisclosed without departing from the essence of the invention.

I claim:

1. In a trailer king pin structure releasably engageable with a tractor fifth wheel, a plurality of shaft aligned and coupled king pins rotatably mounted on a trailer base structure longitudinally thereof, said king pins being correlated in such a way that their axes are maintained at not less than 90° to each other, and means to rotatively move said shaft coupled king pins one at a time into fifth wheel engaging position.

2. In a trailer king pin structure releasably engageable with a tractor fifth wheel, a pair of shaft aligned and coupled king pins rotatably mounted on the trailer base structure longitudinally thereof, said king pins being correlated in such a way that their axes are maintained at not less than 90° to each other, and means to rotatably move each of said shaft coupled king pins one at a time into fifth wheel engaging position.

3. In a trailer king pin structure releasably engageable with a tractor fifth wheel, a plurality of shaft aligned and coupled king pins each rotatably mounted in support bearings affixed to the trailer base structure longitudinally thereof adjacent the forward end of said trailer, said king pins being correlatedly conjoined in such a way that their axes are maintained at not less than 90° to each other, and means to rotatively move said shaft coupled king pins simultaneously and each of said king pins one at a time into fifth wheel engaging position, whereby when one of said king pins is in fifth wheel engaging position the remainder of said king pins are fully out of that position.

4. The structure defined in claim 3, and in which said shaft coupled king pins are rotatably mounted in each of said bearings upon a base plate underlying said base structure, said plate having openings therethrough for passage of said king pins into and out of said fifth wheel engaging position.

5. In a trailer king pin structure releasably engageable with a tractor fifth wheel, a pair of shaft aligned and coupled king pins each rotatably mounted in support bearings affixed to the trailer base structure longitudinally thereof adjacent the forward end of said trailer, each of said king pins being fixedly mounted for rotation upon a shaft horizontally disposed in said bearings and correlatedly conjoined by a coupling in such a way that the axes of said pins are maintained at not less than 90° to each other, one of said pins being aligned forward of the other, and means to rotatively move said shaft coupled king pins simultaneously and each of said king pins one at a time into fifth wheel engaging position, whereby when one of said king pins is in fifth wheel engaging position the other is fully out of that position.

6. In a trailer king pin structure releasably engageable with a tractor fifth wheel, a pair of shaft aligned and coupled king pins each rotatably mounted on the trailer base structure longitudinally of said trailer adjacent its forward end, each of said king pins being correlatedly conjoined by a coupling in such a way that the axes of said pins are maintained at not less than 90° to each other, one of said pins being aligned forward of the other, and lever means aligned with and conjoined to said shaft coupled king pins to rotatively move said king pins simultaneously and each of said king pins one at a time into fifth wheel engaging position, whereby when one of said king pins is in fifth wheel engaging position the other is fully out of that position.

7. The structure defined in claim 6, and in which said lever means is provided with an element positioned exteriorly of and at the forward end of said trailer for manual operation of said king pin structure.

8. The structure defined in claim 6, and in which said king pins are integrally formed with shafts mounted for rotation horizontally on and parallel to said base structure.

9. The structure defined in claim 8, and in which said lever means, king pin shafts and coupling are releasably and removably conjoined.

10. In a trailer king pin structure releasably engageable with a tractor fifth wheel structure, a pair of king pins having conjoined rotatable shafts mounted in a trailer base structure longitudinally thereof in spaced relationship to each other at the forward end of said trailer, said king pins being correlatedly conjoined so that their axes are substantially at right angles to each other, and means conjoined to the foremost king pin shaft to selectively move each of said king pins one at a time into fifth wheel engaging position and simultaneously the other of said king pins out of fifth wheel engaging position and into the plane of said base structure.

11. In a trailer king pin structure releasably engageable with a tractor fifth wheel structure, a plurality of king pins having conjoined rotatable shafts mounted on a trailer base structure longitudinally thereof in spaced relationship to each other at the forward end of said trailer, said king pins being correlatedly conjoined so that their axes are maintained at not less than 90° to each other, and means conjoined to said king pin shafts to selectively move each of said king pins one at a time into fifth wheel engaging position and simultaneously the remainder of said king pins out of fifth wheel engaging position and into the plane of said base structure.

12. In a trailer king pin construction releasably engageable with a tractor fifth wheel structure, a plurality of conjoined king pins having rotatable shafts mounted on a trailer base structure, said king pins being arranged longitudinally of and adjacent the forward end of said trailer in spaced relationship to each other, said king pins being correlatedly conjoined so that only one of said king pins is arranged in fifth wheel engaging position at a time, and means conjoined to said king pins to selectively move each of said king pins one at a time into fifth wheel engaging position and simultaneously the remainder of said king pins out of fifth wheel engaging position.

References Cited in the file of this patent

UNITED STATES PATENTS

| | | |
|---|---|---|
| 2,494,799 | Duvall et al. | Jan. 17, 1950 |
| 2,553,959 | Cook et al. | May 22, 1951 |
| 2,761,699 | Martin | Sept. 4, 1956 |
| 2,799,516 | Greenway | July 16, 1957 |

FOREIGN PATENTS

| | | |
|---|---|---|
| 12,392 1884 | Great Britain | Sept. 15, 1884 |